United States Patent

[11] 3,566,969

| [72] | Inventors | Alfred R. Hendrickson<br>Tulsa, Okla.;<br>Bobby L. Atkins, Jackson, Tex. |
|---|---|---|
| [21] | Appl. No. | 600,715 |
| [22] | Filed | Dec. 12, 1966 |
| [45] | Patented | Mar. 2, 1971 |
| [73] | Assignee | The Dow Chemical Company<br>Midland, Mich.<br>Continuation-in-part of application Ser. No. 323,140, Nov. 12, 1963, now abandoned. |

[54] METHOD OF GELLING ORGANIC POLAR LIQUIDS AND COMPOSITIONS SO MADE, AND USE THEREFOR
14 Claims, No Drawings

[52] U.S. Cl.................................................. 166/299,
166/300, 149/36, 149/89, 260/88.3
[51] Int. Cl.......................................................... E21b 43/26
[50] Field of Search.............................. 252/316(Inquired),
8.55(C); 106/311; 260/30.2,
41, 33.4, 88.1, 88.3; 149/65PVP(Inquired), 85,
87.2, 82; 167/65RVP, (Inquired), 85, 87.2, 82;
44/7(C), 7(D); 166/30, 33, 42, 42.1, 36, 38

[56] References Cited
UNITED STATES PATENTS

| 2,658,045 | 11/1953 | Schildknecht............... | 252/316 |
| 2,810,716 | 10/1957 | Markus......................... | 260/88.1 |
| 2,820,741 | 1/1958 | Endicott et al. ............. | 167/82 |
| 3,114,419 | 12/1963 | Perry et al. .................. | 166/33 |
| 3,116,187 | 12/1963 | Scanlon et al. ............... | 149/36X |
| 3,144,391 | 8/1964 | Goff.............................. | 166/87.2 |
| 3,116,264 | 12/1963 | Wahl............................. | 166/33X |
| 3,164,505 | 1/1965 | Hsieh et al.................... | 149/36 |

OTHER REFERENCES

Plasdone Polyvinylpyrrolidone, General Aniline and Film Corp., New Product Bulletin No. P-100, June 15, 1951 New York

*Primary Examiner*—Stephen J. Novosad
*Attorneys*—Griswold & Burdick and Charles W. Carlin

ABSTRACT: Organic polar liquids, e.g., halogenated alkanes, halogenated alkenes, tertiary amines, ketones, and esters formed by the reaction of $C_1$ to $C_4$ alcohols, ethyl- and methyl-substituted hydrazines, and nitroalkanes can be satisfactorily gelled by admixing therewith, first between about 1 and about 30 percent (usually between about 2 and about 20 percent), by weight, of an alcohol containing from 1 to 5 carbon atoms per molecule and then admixing therewith a cross linked N-vinylpyrrolidone polymer. The gelled composition so made has utility for use in explosives and as a carrier for pesticides, resin coatings and the like.

METHOD OF GELLING ORGANIC POLAR LIQUIDS AND COMPOSITIONS SO MADE, AND USE THEREFOR

This application is a continuation-in-part of Ser. No. 323,140, filed Nov. 12, 1963 now abandoned.

The invention is an improved method of gelling certain organic liquids, the resulting novel gelled organic composition, and method of use thereof.

Although a number or organic liquids are highly useful for specific purposes, their usefulness is often seriously limited because the liquid state is not adaptable for use under a number of conditions. Illustrative of such conditions are those existing in the use of combustible materials, e.g., explosives and propellants, and the use of gelled compositions as in cleaning and pest eradication.

Gelatin is usually accomplished by admixing a gelling agent with a liquid to be gelled. A suitable gelling agent must be specifically selected in accordance with the nature of the liquid to be gelled and with the use to be made of the resulting gelled composition. For example, some gelling agents cannot be used (even though they effectuate gelation) because they impart undesirable properties to the gelled composition.

In some instances a gel is desired which is of a nature that it remain pumpable or spreadable. Such gels are sometimes referred to as semigels.

There is a need for an improved method of gelling combustible, explosive, cleaning or carrier liquids. There is a special need for gelled compositions wherein an organic polar liquid is gelled to a semisolid state, i.e., one that is deformable and flowable and which can be applied in such gelled state as in cleaning, and coating, and can be used in pest eradication. There is also a special need for compositions which are useable at low temperatures. For example, a number of known explosive compositions cannot be used at commonly encountered low temperatures. The invention meets these and related needs. The term, polar liquid, as used herein refers to organic liquids (as opposed to inorganic bases, acids and salts in solution) in which atoms manifest some degree of electrostatic union. Lower alkyl monoalcohols (sometimes called alkanols), although generically considered organic polar liquids, are specifically required in the invention in addition to another organic polar liquid which is to be gelled in combination with the alcohol. It is therefore understood that the alcohols will be named specifically herein and are not included in the term polar organic liquids as used in describing and defining the invention hereinafter. The gelation of lower alkyl alcohols, per se, is not the substance of the invention.

Among liquids, desired to be gelled, are such organic polar liquids as esters, ketones, chlorinated alkanes, nitroalkanes, alkylhydrazines, and t-alkyl amines. Such liquids include those which do not possess a labile hydrogen atom to form a hydrogen bridge and, accordingly, will not be imbibed and gelled by use of such gelling agents as N-vinylpyrrolidone polymers. It is known that lower alkanols (monoalcohols of from 1 to 5 carbon atoms) can be gelled by such polymer. However, heretofore, the organic polar liquids of the types above exemplified, could not be satisfactorily gelled. N-vinylpyrrolidone polymers are particularly desirable as gelling agents because of their desirable stability. The organic polar liquids above named are highly useful in explosive compositions, cleaning solvents, and/or as carrier media for various compounds including herbicides, insecticides, paint pigments and resins. It is often highly desirable that they be in a state of gelation.

We have discovered that such organic polar liquids can be satisfactorily gelled by admixing therewith, first between about 1 and about 30 percent (usually between about 2 and about 20 percent), by weight based on the weight of organic polar liquid to be gelled, of an alcohol containing from 1 to 5 carbon atoms per molecule, and then admixing therewith a limited cross linked N-vinylpyrrolidone polymer.

The N-vinylpyrrolidone polymer required for the practice of the invention must have a relatively high molecular weight. Because it is not truly soluble in a known solvent, the actual molecular weight cannot be ascertained directly by application of known methods. However, since a Fikentscher K value of 90 represents an average molecular weight of 360,000 (and the polymer having such K value still has some water solubility), it can be said that the cross linked N-vinylpyrrolidone polymer required by the invention must have an average molecular weight of at least about 400,000. The maximum molecular weight of the polymer for use in the invention is not definitely known but it can be up to a size just short of that which prevents imbibition of the alcohol-polar solution and therefore fails to swell the solution appreciably, such failure to imbibe manifesting itself by the polymer settling out or by rising to float.

The polymer required for the practice of the invention is not linear water-soluble poly(N-vinylpyrrolidone) which has been found useful for such purposes as (1) making of medicinal tablets as an adhesive and hardening agent which subsequently aids the disintegration of the tablets when wetted, e.g., as described in the Endicott et al. U.S. Pat. No. 2,820,741; or (2) converting an aqueous solution of linear poly(N-vinylpyrrolidone), having a Fikentscher K value of 50 to 80, to a gelled mass by admixture therewith of an organic persulfate which gels the polymer itself into a very firm non-flowable solid, such uses clearly excluding the use of any N-vinylpyrrolidone polymer having a K value of 90 or more since such polymer tends to become water-insoluble; or (3) linear poly(N-vinylpyrrolidone) which is known to be soluble in various organic liquids as described in Plasdone Polyvinylpyrrolidone published by the General Analine and Film Corp., as "New Product Bulletin No. P 100," page 11, (Jun. 15, 1951), New York, N.Y.

The suitability of a cross linked N-vinylpyrrolidone polymer for use in the practice of the invention may be ascertained by obtaining the gel capacity values of the polymer as explained more fully hereinafter.

Methods of preparing N-vinylpyrrolidone polymers, broadly, are known. The practice of the invention requires a specific type of these polymers having limited cross linking. In general, the polymer can be prepared by admixing therewith a cross linking agent and a free-radical promoting catalyst and heating moderately until all the cross linking agent has been used, i.e., until polymerization is complete.

N-vinylpyrrolidone is a well known monomer of which N-vinyl-2-pyrrolidone is best known, having the formula:

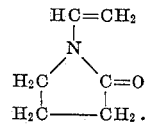

The monomer is usually employed to prepare the cross-linked polymer required for the invention, but previously prepared linear poly(N-vinylpyrrolidone) may be employed.

The monomer or linear polymer is then cross linked either in mass, i.e., without the use of a liquid reaction medium, or in an aqueous or lower aliphatic monoalcohol solution or mixture thereof. It is preferable that the polymerization be carried out in an aqueous solution of at least about 5 percent concentration. Best results are obtained when a monomer or linear polymer, in a concentration of between about 20 and 90 percent (and usually between about 25 and 50 percent), by weight of the reaction mixture, is employed. As aforesaid, a chemical cross linking agent is necessary when employing a chemical catalyst and is recommended when employing irradiation. The cross linking agent is employed in an amount of between 0.1 and 14 percent (preferably between 0.3 and 3 percent), based on the weight of the monomeric N-vinylpyrrolidone employed. Cross linking agents which can be used in preparing the polymer for use in the practice of the invention include any of those which possess an ethylenic linkage which may be broken under the conditions of reaction to form bonds at controlled limited sites at the double bonds of the vinyl groups of the N-vinylpyrrolidone. Illustrative thereof are N,N'-methylene-bisacrylamide, divinyl ether of ethylene glycol, divinyl benzene, diallyl, and diacrylate of polyethylene glycol. The chemical catalyst, when employed, may be any of those known as free-radical catalysts of which water-soluble persulfates, peroxides, $\alpha,\alpha'$-azobisisobutyronitrile, and the redox-type catalysts are illustrative.

When the cross linked polymer is prepared for use in the invention by irradiation techniques, a total dosage of between about 0.5 and about 15 megarads is usually used and preferably a dosage of between about 0.75 3 megarads is used. A rate of irradiation of between about 0.01 and 10 megarads per hour is commonly used.

Care must be exercized in the polymerization process, whether by chemical catalysts or by irradiation, to control the extend of cross linking as so as to provide a polymer which is sufficiently cross linked to be dispersible and swellable in the alcohol-polar liquid to be gelled, but which is insufficiently cross linked to prevent the desired dispersing, swelling and imbibing of adequate volumes of the organic polar liquid to result in its gelation.

The polymer is formed as a separate phase in the reaction medium and can be separated therefrom by known techniques including filtration and centrifugation.

A specific example of the preparation of a suitable cross linked N-vinylpyrrolidone polymer by irradiation is as follows: an aqueous solution, containing 50 percent by weight of N-vinylpyrrolidone, is irradiated with a dosage of 0.805 megarad from a 3,500 Curie cobalt-60 source of gamma rays at a dosage rate of 0.23 megarad hour. THe polymer so made is separated from the reaction medium, dried in an oven, e.g., from 4 to 10 hours at a suitable temperature, e.g., 100° to 140° C., and then ground to a powder, e.g., such as will substantially all pass through a 100 mesh screen.

A specific example of preparing the polymer for the practice of the invention by chemical catalysts catalysis is as follows: a mixture of 450 grams of N-vinylpyrrolidone, 0.9 gram of $\alpha,\alpha'$-azobisisobutyronitrile (as a catalyst), 0.45 milliliter of 1-amino-2-propanol (to assure a slightly alkaline pH value) 2.25 grams of divinyl ether of diethylene glycol (as a cross linking agent), and 1,800 milliliters of water are placed in a suitable container and heated for about 8 hours under a protective blanket of nitrogen at from about 70° to 80° C. The polymer so formed is dried, e.g. by being placed in an oven at between 80° and 140° C., and then ground to a suitable size powder.

Illustrative of another procedure for preparing the polymerized N-vinyl-2-pyrrolidone for use in the practice of the invention is a combination of the above two procedures which comprises irradiating N-vinylpyrrolidone in admixture with a cross linking agent, and preferably also containing a catalyst to provide an initiating source of free radicals. An aqueous solution is preferred over in mass polymerization. As illustrative, a 50 percent aqueous solution of N-vinylpyrrolidone, containing 0.5 percent by weight of divinyl ether of diethylene glycol as cross linker biased on the monomer, is exposed to a dosage of 0.24 megarad of gamma radiation from a cobalt-60 source. A free-radical catalyst, e.g., a peroxide, can be employed with an appropriate reduction in the quantity of radiation required.

Any of the above methods of polymerization is acceptable so long as the extent of cross linking is controlled to provide a polymer which, as stated, is not fully and completely soluble in the polar liquid-alcohol mixture in which it is to be used but which, on the other hand, is not insoluble therein to the extent that it settles out or floats on top of the polar liquid-alcohol mixture in which it is to be used. It must be s dispersible and swellable in the polar liquid-alcohol mixture with which it forms a firm gel.

The desired extent of cross linking when employing a cross linking agent is attained by employing a carefully limited amount of such agent. Between 0.1 and 14 percent of a selected cross linking agent (more preferably between 0.3 and 3), based on the weight of N-vinylpyrrolidone, is recommended and the polymerizable mixture polymerized to completion. There is thereby attained a gel capacity in water of at least 8. It is recommended that the gel capacity be not less than 10 and preferably not less than about 20. Gel capacity is expressed as percent gel and is a standard term which means the number of milliliters of water, measured at about 20° C., that will be gelled by admixing therewith 1 gram of the polymer. Specific evaluations of acceptable cross linked polymers for the invention by ascertaining their gel capacities is set out hereinafter.

Additional details for the preparation of cross linked N-vinylpyrrolidone polymers suitable for use in the practice of the invention can be found in U.S. Pat. No. 2,810,716, in the Jr. of Polym. Science, Vol. 23, page 355 and particularly pages 949 to 952 (1957), and in the Jr. of Phys. Chemistry, vol. 63, page 1,852 (1959).

Evaluations of N-vinylpyrrolidone polymers prepared for use in the practice of the invention were conducted according to the procedure set out below. The effect on the extent of cross linking (as evidenced by changes in gel capacity) by varying the amount of cross linking agent is shown.

EXAMPLES 1 TO 8

Three hundred grams of N-vinylpyrrolidone and 0.15 gram of $\alpha,\alpha'$-azobisisobutyronitrile (with the two exceptions noted below) and the amount of N,N'-methylenebisacrylamide set out in table I below were admixed with 1,200 grams of water (with the two exceptions noted below) for the purpose of conducting each of the examples. The resulting mixtures where were polymerized at between 70° and 80° C. for 16 hours. This was sufficient for the polymerization to go to completion. The polymer produced in each example was separated from the reaction medium and dried and the gel capacity in each of water and in isopropyl alcohol determined. The results are also shown in table I.

TABLE I

| | N,N'-methylenebisacrylamide | | Gel capacity in grams of liquid gelled per gram of polymer | |
|---|---|---|---|---|
| | In grams | In percent by weight of NVP [1] | In H$_2$O | In isopropyl alcohol |
| Example number: | | | | |
| 1 | 0.6 | 0.2 | ---------- | 8.8 |
| 2 | 0.9 | 0.3 | 25.8 | 26.2 |
| 3 [2] | 1.5 | 0.5 | 24.5 | 21.6 |
| 4 [2] | 2.1 | 0.7 | 27.6 | 24.4 |
| 5 [2] | 3.0 | 1.0 | 27.2 | 22.0 |
| 6 | 3.6 | 1.2 | 23.0 | 25.1 |
| 7 [3] | 4.7 | 1.5 | 23.5 | 22.3 |
| 8 [4] | 6.0 | 2.0 | 14.5 | 14.2 |

[1] NVP = N-vinylpyrrolidone.
[2] Contained 0.5 per cent of 1-amino-2-propanol to maintain the pH value slightly on the alkaline side.
[3] In Example 7, 975 grams of water and 0.3 gram of $\alpha,\alpha'$-azobisisobutyronotrile were used.
[4] In Example 8, 900 grams of water and 0.3 gram of $\alpha,\alpha'$-azobisbutyronotrile were used.

Reference to table I shows a successful evaluation of the gel capacity in water of the polymer of example 1 was not made. However, by correlation with the gel capacity values in the alcohol, it can be calculated to be about 8.5. Further reference to table I shows that the gel capacity of the N-vinylpyrrolidone polymer prepared by employing from 0.3 to 2 parts of the cross linking agent per 100 parts of N-vinylpyrrolidone gave very satisfactory gel capacities. Although the results show a dropping off of gel capacity when employing only about 0.3 part of the cross linking agent per 100 parts of the N-vinylpyrrolidone, extrapolation shows that as little as about 0.1 part of the cross linking agent per 100 parts of N-vinylpyrrolidone may be employed to produce a polymer which has a satisfactory gel capacity.

The examples set out in table I were repeated except that the following amounts of ingredients were employed for each example: 1,800 grams of water; 450 grams of N-vinylpyrrolidone; 0.9 gram of α,α'-azobisisobutyronitrile; and the amount of divinyl ether of diethylene glycol set out in table II, below. The same procedure as was followed in the examples of table I was observed. The polymer produced in each example was evaluated for gel capacity in water and in isopropyl alcohol; the results are also set out in table II.

TABLE II

| Example number: | Divinyl ether of diethylene glycol | | Gel capacity [1] | |
|---|---|---|---|---|
| | In grams | In percent by weight of NVP [1] | In H₂O | In isopropyl alcohol |
| 9 | 13.5 | 3.0 | 28.1 | 28.6 |
| 10 | 22.5 | 5.0 | 23.4 | 22.0 |
| 11 | 45.0 | 10.0 | 15.8 | 15.3 |

[1] Gel capacity and NVP have the same significance as in Table I.

The results of table II show that the amount of cross linking agent may be increased to at least 10 parts, per 100 parts by weight of the N-vinylpyrrolidone and still produce an acceptable polymer. Although the gel capacity values drop off as the amount of cross linking agent is increased above about 4 percent, by weight of N-vinylpyrrolidone present, it is seen by extrapolation that the amount of cross linking agent may be increased to about 14 parts and yet yield a polymer of acceptable get capacity. Polymers yielding a gel capacity of less than 8 are considered unsatisfactory for the practice of the invention.

Further examples for evaluation of suitable polymers for use in the invention were conducted similarly to those of tables I and II but wherein the changes in amounts and the precise nature of the ingredients, and the resulting gel capacities, are those shown in tables III and IV.

EXAMPLES 12 TO 16

The procedure followed was the same as that in tables I and II except that the following amounts of reactants were employed and 5 milliliters of concentrated aqueous NH₄OH were added to maintain a slightly alkaline pH value.

TABLE III

| Example number: | Divinyl ether of diethylene glycol | | Gel capacity in grams of H₂O gelled per gram of polymer |
|---|---|---|---|
| | In grams | In percent by weight of NVP [1] | |
| 12 | 2.25 | 0.5 | 34.7 |
| 13 | 3.15 | 0.7 | 34.4 |
| 14 | 4.50 | 1.0 | 49.1 |
| 15 | 6.30 | 1.4 | 44.8 |
| 16 | 8.10 | 1.8 | 35.3 |

[1] NVP is N-vinylpyrrolidone.

TABLE IV

| Example number: | Divinyl benzene | | Gel capacity in grams of liquid gelled per gram of polymer | |
|---|---|---|---|---|
| | In grams | In percent by weight of NVP [1] | In H₂O | In isopropyl alcohol |
| 17 | 0.9 | 0.3 | 23.2 | 25.0 |
| 18 | 1.5 | 0.5 | 34.1 | 31.4 |
| 19 | [2] 3.0 | 1.0 | 37.5 | 35.1 |
| 20 | 3.6 | 1.2 | 20.2 | 22.6 |

[1] NVP is N-vinylpyrrolidone.
[2] 0.15 gram (rather than 0.3 gram) of α,α'-azobisisobutyronitrile was used.

As stated, a polymer having a gel capacity in water of not less than about 8 is required for good results in the invention. Reference to the results shown in tables I to IV show that any amount of the cross linking agent between about 0.1 and 14 parts (based on 100 parts of the N-vinylpyrrolidone) may be employed to obtain a gel capacity of at least 8 in water.

The following examples (21 to 28) are illustrative of polymers prepared by employing different selected cross linking agents in varying amounts and polymerizing to completion to produce polymers which are satisfactory for the practice of the invention.

EXAMPLES 21 TO 28

The ingredients, amounts thereof, and polymerization temperature and time are set out in table V.

TABLE V

| Example number | Weight in grams of NVP([1]) | Water in ml. | Catalyst in grams | Cross-linking agent in grams | Temperature in ° C. | Polymerization time in hours |
|---|---|---|---|---|---|---|
| 21 | 450 | 1,900 | 0.9 ABN [2] | 2.25 DVEDEG [3] | 70–80 | 8 |
| 22 | 100 | 400 | 0.3 ABN | 0.5 DVB [4] | 60–80 | 0.5 |
| 23 | 100 | 400 | 0.3 ABN | 1.0 DVB | 50–70 | 1 |
| 24 | 100 | 400 | 0.3 ABN | 0.5 MBA [5] | 60–80 | 2 |
| 25 | 100 | 400 | 0.3 ABN | 1.0 MBA | 70–80 | 1 |
| 26 | 100 | 400 | 0.3 ABN | 0.3 DVEDEG | 70–80 | 1 |
| 27 | 100 | 400 | 0.3 ABN | 1.5 DVEDEG | 50–70 | 2 |
| 28 | 100 | 400 | 0.3 ABN | 1.0 PGDA [6] | 60–80 | 2 |

[1] NVP = N-vinylpyrrolidone.
[2] ABN = α,α'-azobisisobutyronitrile.
[3] DVEDEG = divinyl ether of diethylene glycol.
[4] DVB = divinyl benzene.
[5] MBA = N,N'-methylenebisacrylamide.
[6] PGDA = diacrylate of polyethylene glycol (avg. mol. wt. 600).

Reference to table V shows that the selected cross linking agents, and in the amounts, exemplified there are quite satisfactory for use in the preparation of the polymer for use in the practice of the invention.

Comparative tests and examples which illustrate the practice of the invention are set out hereinbelow.

EXAMPLE 29

As a further example of the cross linked polymer suitable for use in the practice of the invention, 100 grams of N-vinylpyrrolidone were dissolved in 100 milliliters of water (measured at 20° C.) and subjected to gamma radiation provided by cobalt-60 for a total irradiation of 0.69 megarad. A cross-linked polymer resulted having a gel capacity of about 25. A total irradiation providing between about 0.3 and 3 megarads is preferred.

COMPARATIVE TEST A

N-vinylpyrrolidone was dissolved in water to make a 20 percent by weight aqueous solution. Divinyl ether of diethylene glycol in an amount of about 1 percent by weight of the N-vinylpyrrolidone and a catalytic amount (about 0.5 percent by weight) of α,α'-azobisisobutyronitrile were admixed therewith and the temperature controlled at between about 60° and 70° C. The cross linked N-vinylpyrrolidone polymer was thereby formed. The polymer so formed was separated and dried and portions of the dried polymer admixed with aliquot portions of perchloroethylene (an organic polar liquid) in amounts varying between 1 percent and 10 percent by weight of the polar liquids. No gelation occurred.

EXAMPLE 30

To illustrate the practice of the invention, 5 percent by weight of isopropyl alcohol was admixed with additional aliquot portions of perchloroethylene, and thereafter 2 percent of the cross linked N-vinylpyrrolidone polymer, based on the weight of the perchloroethylene, admixed with the perchloroethylene and alcohol mixtures. The entire quantity of the perchloroethylene completely gelled immediately in each instance.

COMPARATIVE TEST B

For comparative purposes, cross linked N-vinylpyrrolidone polymer, prepared as above, was admixed in amounts varying between 1 percent and 10 percent, with aliquot portions of 1,1,1-trichloroethane. No gelation occurred at any concentration of the polymer.

EXAMPLE 31

To illustrate the invention, the procedure was repeated, employing other aliquot portions of 1,1,1-trichloroethane, except that there was first admixed with each portion of the 1,1,1,-trichloroethane 10 percent by weight of isopropyl alcohol, based on the weight of the 1,1,1-trichloroethane. Thereafter 2 percent, based on the weight of the 1,1,1-trichloroethane present, of the N-vinylpyrrolidone polymer was admixed therewith. Complete gelation was effected immediately in each instance.

COMPARATIVE TEST C

For comparative purposes comparative tests A and B were repeated except that chlorobromomethane portions were substituted for the perchloroethylene of test A and for the 1,1,1-trichloroethane of test B. When the polymer was admixed with each of the chlorobromomethane portions, no gelation occurred.

EXAMPLE 32

The procedure of test C was repeated except 5 percent by weight of 2-propanol was first admixed with the chlorobromomethane portions and thereafter 2 percent of the N-vinylpyrrolidone polymer, each based on the weight of the chlorobromomethane, were admixed therewith according to the invention. Gelation took place immediately in each instance.

COMPARATIVE TEST D

The above comparative tests were repeated except that acetone was employed as the organic polar liquid instead of those above used. N-vinylpyrrolidone polymer was employed in amounts varying up to 10 percent by weight of acetone; no gelation occurred.

EXAMPLE 33

Test D was repeated except that between 5 and 15 percent of each of methanol, ethanol, n-propanol, 2-propanol, secondary butanol, and n-butanol were admixed with aliquot portions of acetone, based on the weight of the acetone present; thereafter varying amounts of the N-vinylpyrrolidone polymer were admixed with each portion of alcohol-acetone in accordance with the invention. Each acetone-alcohol mixture gelled promptly.

COMPARATIVE TEST E

The above tests were repeated except that methyl ethyl ketone was substituted for the organic polar materials employed in the above tests and examples. Varying amounts of the N-vinylpyrrolidone polymer were admixed therewith. No gelation occurred in any test.

EXAMPLE 34

Test E was repeated except that between 5 percent and 15 percent of various $C_1$ to $C_4$ alcohols and mixtures thereof were admixed with aliquot portions of the ketone followed by 2 percent of the N-vinylpyrrolidone polymer, in accordance with the invention. Each addition was based on the weight of methyl ethyl ketone. Gelation occurred promptly.

COMPARATIVE TEST F

The above tests were again repeated except that ethyl acetate was employed instead of the organic polar liquids employed above. Upon the addition of the N-vinylpyrrolidone polymer to the ethyl acetate portions, no gelation occurred.

EXAMPLE 35

Test E was repeated except that between about 5 percent and 15 percent of each of selected $C_1$ to $C_4$ alcohols and mixtures thereof were first admixed with aliquot portions of the ethyl acetate and thereafter 2 percent of the cross linked N-vinylpyrrolidone polymer, based on the weight of ethyl acetate was admixed therewith, according to the invention. Gelation occurred promptly.

COMPARATIVE TEST G

The above comparative tests were repeated except that the organic polar liquid employed was chloroform. No gelation occurred in any test.

EXAMPLE 36

Test G was repeated except that $C_1$ to $C_4$ alcohols and mixtures thereof in amounts up to 10 percent were first admixed with the chloroform prior to admixing varying amounts (up to 10 percent based on the weight of the chloroform) of N-vinylpyrrolidone polymer with the chloroform-alcohol mixtures. Gelation occurred promptly in each instance.

COMPARATIVE TEST H

To aliquot portions of each of dimethyl hydrazine and 2-nitropropane, were admixed in relatively large amounts, the cross linked N-vinylpyrrolidone polymer. Some gelation was observed to occur but which, in general, was unsatisfactory.

EXAMPLE 37

$C_1$ to $C_4$ alcohols in accordance with the invention were admixed with aliquot portions of each of dimethyl hydrazine and 2-nitropropane. Thereafter about half the amounts of the N-vinylpyrrolidone polymer, as was employed in test H, were admixed with each of the alcohol and dimethyl hydrazine and the alcohol and 2-nitropropane solutions. Gelation occurred quickly and completely in each instance.

COMPARATIVE TEST I

Efforts were made to gel the following substantially nonpolar organic materials, by admixing therewith up to 30 parts of $C_1$ to $C_5$ monoalcohols followed by up to 20 parts (based on 100 parts by weight of the selected nonpolar liquid) of the N-vinylpyrrolidone polymer: carbon tetrachloride, hexane, kerosene, and benzene. None of these materials showed any inclination to gel by the treatment; the results more were clearly unacceptable.

EXAMPLES 38 TO 41

To demonstrate the practice of the invention and to show its successful performance in contrast to attempts to prepare a satisfactory gel according to known practice, examples 38 to 41 were conducted. In each example, 2 percent by weight of the cross linked N-vinylpyrrolidone polymer prepared according to example 25 of table V above was admixed with 20 equal-size portions of each of the organic polar liquids named in table VI. The effect on gelation was noted and made of record in table VI for comparative purposes. Thereafter, to each of said portions was admixed one of the five alcohols named therein, and in the varying amounts shown opposite each polar liquid, in the table. The results are also set out in table VI.

the cross linked N-vinylpyrrolidone polymer required by the invention, viz. one having a gel capacity in water of at least 8, e.g. that made by polymerizing N-vinylpyrrolidone by employing at least 0.1 but not more than 14 percent, and preferably 0.2 to 10 percent, (by weight of N-vinylpyrrolidone monomer) of a cross linking agent.

COMPARATIVE TEST J

For comparative purposes, various nonpolar organic liquids, including such hydrocarbons as, hexane, kerosene,

TABLE VI

| Example number | Organic polar liquid employed | Alcohol employed | Percent alcohol employed (based on weight of the polar liquid present) and resulting gelation, if any | | | |
|---|---|---|---|---|---|---|
| | | | 0 | 5 | 10 | 15 |
| 38 | Chlorobromomethane | MeOH | no gel | Gel | Gel | Gel |
| | | EtOH | do | Gel | Gel | Gel |
| | | n-PrOH | do | Gel | Gel | Gel |
| | | 2-PrOH | do | Gel | Gel | Gel |
| | | n-BuOH | do | Gel | Gel | Gel |
| 39 | Methyl ethyl ketone | MeOH | do | Gel | Gel | Gel |
| | | EtOH | do | Gel | Gel | Gel |
| | | n-PrOH | do | Gel | Gel | Gel |
| | | 2-PrOH | do | Gel | Gel | Gel |
| | | n-BuOH | do | Gel | Gel | Gel |
| 40 | Ethyl acetate | MeOH | do | Gel | Gel | Gel |
| | | EtOH | do | Gel | Gel | Gel |
| | | n-PrOH | do | Gel | Gel | Gel |
| | | 2-PrOH | do | Gel | Gel | Gel |
| | | n-BuOH | do | Gel | Gel | Gel |
| 41 | Chloroform | MeOH | do | Gel | Gel | Gel |
| | | EtOH | do | Gel | Gel | Gel |
| | | n-PrOH | do | Gel | Gel | Gel |
| | | 2-PrOH | do | Gel | Gel | Gel |
| | | n-BuOH | do | Gel | Gel | Gel |

NOTE.—In the organic polar liquid alone (no alcohol) the polymer remained at the bottom of the container. Gel indicates a firm acceptable gel for use as a gelled composition.

Reference to table VI shows that the presence of the alcohol is essential for effective gelation of the organic polar liquid in all instances. The gel was progressively firmer and of greater consistency as the percentage of alcohol was increased. Amounts of alcohol in excess of 20 percent by weight of the organic polar liquid appear unwarranted. In fact, only about 5 to 10 percent appears necessary for excellent results. Little difference was apparent for the different alcohols except that n-butanol appears to be somewhat less effective than the lower alcohols.

EXAMPLE 42

The examples of table VI were repeated employing other polymers selected from table V. Very similar results were obtained to those set out in table VI, the gel showing greater uniformity and firmness when the polymer employed was that prepared by employing between 0.3 and 2 percent of the cross linking agent, based on the weight of monomeric N-vinylpyrrolidone in the polymerizable mixture, and also directly in accordance with the higher percentages of the alcohol employed with diminishing improvement after about 10 to 20 percent by weight based on the organic polar liquid.

EXAMPLE 43

For comparative purposes, the examples of table VI were repeated employing various randomly selected well-known polymers with the alcohols and the organic polar solvents thereinabove employed. Among the polymers employed were vinylmorpholinone polymers, polyacrylamide, linear poly(N-vinylpyrrolidone) and, in separate tests, both very lightly and highly cross linked N-vinylpyrrolidone polymers, i.e., those N-vinylpyrrolidone polymers having a low gel capacity. Of all organic liquids tested, only a few chlorinated hydrocarbons could be gelled to a limited extent by using vinylmorpholinone polymers. Polyacrylamide and linear poly(N-vinylpyrrolidone) did not produce a gel in any instance. The lightly cross linked N-vinylpyrrolidone polymers did not produce a gel. The highly cross linked N-vinylpyrrolidone polymers precipitated from the alcohol organic polar liquid. None of the polymers tried in this example was acceptable as equivalent to benzene, and $CCl_4$, were admixed with various lower alkyl monoalcohols in amounts up to 30 percent based on the weight of the organic nonpolar liquid followed by admixing the cross linked N-vinylpyrrolidone polymer therewith. No satisfactory gel was obtained. The alcohol tended to separate from the nonpolar liquid and the polymer tended to precipitate out. The nonpolar liquids or solvents are unacceptable for the practice of the invention.

EXAMPLE 44

Test J was substantially repeated employing instead of the nonpolar liquids various selected organic polar solvents, including halogenated hydrocarbons, e.g. chloroethane, chloroform, chlorobromomethane, perchloroethylene, chloroethane; ketones, e.g. acetone and methyl ethyl ketone; esters, e.g., ethyl acetate; nitroalkanes, e.g., 2-nitropropane; and dialkylhydrazine, e.g., dimethylhydrazine with a lower alkyl alcohol followed by any of the cross linked N-vinylpyrrolidone polymers defined hereinabove. Good gels were produced in each instance.

The organic solvents or liquids which can be gelled by the practice of the invention are those which are polar. Such solvents as $CCl_4$ and the liquid hydrocarbons illustrate organic liquids which are not acceptable whereas esters, nitroalkanes, t-amines, alkyl hydrazines, ketones, and chlorinated hydrocarbons illustrate polar liquids or solvents which can be gelled by the invention.

EXAMPLE 45

Selected amounts in separate vessels of organic polar liquids, as illustrated for use in the above examples, may be admixed with various insecticides, herbicides, or protective resins such as alkyd resins. The resulting liquid mixture gels according to the invention and the gelled material when applied to surfaces which are not horizontal, i.e. where drainage of unspent or undried material is a problem, the gel greatly inhibits the tendency of the applied material to run or drain away, its use thereby resulting in substantially uniform application, increased efficiency, a marked reduction in lost or wasted material, and a cleaner job.

EXAMPLE 46

Organic polar liquids suitable for rapid oxidation in the presence of a selected oxidizing agent may be advantageously gelled according to the invention. The nitroalkanes, e.g. nitropropane, illustrate such liquids; they are highly oxidizable fuels or rapid reducing agents useable with various oxidizing agents such as chlorates, peroxides, or concentrated nitric acid or fuming sulfuric or fuming nitric acid. The nitroalkane may be admixed with an alcohol and thereafter (or prior thereto) admixed with a combustible organic polar carrier liquid such as a halogenated alkane, ester or the like. The so-gelled component of an explosive or combustible mixture may then be more safely and conveniently handled and emplaced and detonated as desired. By proper selection of the two components, viz. the reducing agent and the oxidizing agent, a hypergolic mixture can be provided. If desired the oxidizing agent e.g. fuming nitric acid can be independently gelled by a known technique. This embodiment of the invention has special significance in conducting explosions in underground formations penetrated by a wellbore when the components of the explosion are maintained out of contact with each other during injection but which forms a hypergolic mixture when brought into contact at the desired locus in the formation.

We claim:

1. The method of gelling an organic polar liquid selected from the class consisting of halogenated alkenes and halogenated alkanes the latter containing at least one unsubstituted hydrogen atom and said halogenated alkenes and alkanes having from 1 to 5 carbon atoms, nitroalkanes having from 1 to 5 carbon atoms, tertiary-alkyl amines having from 1 to 5 carbon atoms, ketones, esters formed by reacting at least one 1 to 4 carbon atom monocarboxylic acid with at least one 1 to 4 aliphatic monoalcohol, and methyl- and ethyl-substituted hydrazines, said method comprising admixing, with the organic polar liquid to be gelled, between about 1 and 30 parts of a 1 to 5 carbon atom aliphatic monoalcohol per 100 parts by weight of the organic polar liquid, and then admixing with the resulting mixture so made between about 0.1 and about 20 parts of a cross linked N-vinylpyrrolidone polymer having a gel capacity in water of at least about 8, and a molecular weight of at least 400,000.

2. The method according to claim 1 wherein said monoalcohol is selected from the class consisting of methanol, ethanol, n-propanol, 2-propanol, n-butanol, and 2-butanol.

3. The method according to claim 2 wherein the amount of free-radical polymerization catalyst is present in an amount of between about 0.1 and 2 parts per 100 parts of N-vinylpyrrolidone monomer in the monomeric mixture, and is selected from the class consisting of peroxides, persulfates, and $\alpha, \alpha'$-asobisisobutyronitrile.

4. The method according to claim 1 wherein said N-vinylpyrrolidone polymer is that made by polymerizing N-vinyl-2-pyrrolidone with between about 0.1 and 14 parts, per 100 parts by weight of the N-vinylpyrrolidone, of a cross linking agent selected from the class consisting of divinyl ether of diethylene glycol, diallyl, divinyl benzenes, N,N'-methylenebisacrylamide, and diacrylate of a polyalkylene glycol having a molecular weight of between about 200 and about 1,000, in the presence of a small but effective amount of a free-radical promoting polymerization catalyst, at a temperature of between about 20° and 100° C. for between about 1 and about 24 hours.

5. The method according to claim 4 wherein said cross linking agent is present in an amount of between about 0.3 and 3 parts per 100 parts of the N-vinyl-2-vinyl-pyrrolidone present in the monomeric mixture.

6. The method according to claim 4 wherein said cross linking agent is N,N'-methylenebisacrylamide and said free-radical promoting polymerization catalyst is $\alpha, \alpha'$azobisisobutyronitrile.

7. The method according to claim 1 wherein polymerization of N-vinylpyrrolidone is effectuated by subjecting the monomer to irradiation for a time sufficient to provide a total of between about 0.3 and 3 megarads.

8. The method according to claim 7 wherein a small but effective amount of a free-radical promoting polymerization catalyst is present in the polymerizable monomeric mixture.

9. The method according to claim 7 wherein between about 0.1 and 2 parts, of a cross linking agent, per 100 parts of N-vinylpyrrolidone monomer, is present in the monomeric mixture.

10. The method of applying a normally liquid composition to a solid surface in a gelled state comprising (A) admixing (1) an organic polar liquid selected from the class consisting of halogenated alkenes and halogenated alkanes the latter having at least 1 unsubstituted H atom and said alkanes and alkenes having from 1 to 5 carbon atoms, ketones, esters formed by reacting at least one 1 to 4 carbon atom monocarboxylic acid with at least one 1 to 4 aliphatic monoalcohol methyl- and ethyl-substituted hydrazines, and nitroalkanes with (2) from about 1 to about 30 parts of a 1 to 5 carbon atom monoalcohol per 100 parts by weight of said organic polar liquid to form a solution, (B) admixing with the resulting solution from about 0.1 to about 20 parts based on the weight of the solution of a cross linked N-vinylpyrrolidone polymer having a gel capacity in water of at least about 8 and a molecular weight of at least about 400,000, thereby to gel the composition, and (C) applying the resulting gelled composition to said surface.

11. In a method of producing combustion at a desired locus employing a multiple liquid component combustible mixture, said mixture comprising an oxidizing agent and a fuel, the improvement which comprises employing as said fuel a nitroalkane which has been converted to a gel by admixture therewith of a 1 to 5 carbon aliphatic monoalcohol and, subsequent thereto, from about 0.1 to about 20 parts of a cross linked N-vinylpyrrolidone having a gel capacity in water of at least 8, and bringing said oxidizing agent and said gel into contact with each other as at said locus.

12. In the method of producing an explosion in an underground formation penetrated by a wellbore employing an explosive mixture composed of at least two components, one of which component is a liquid oxidizing agent and the other component is a normally liquid fuel, which are injected out of direct contact with each other down the wellbore and which thereafter are brought into contact with each other at the desired locus in the formation where the explosion is desired to occur, the improvement comprising admixing with a 1 to 4 carbon atom nitroalkane first between about 1 and 30 parts by weight, per 100 parts of the nitroalkane, of a 1 to 5 carbon atom aliphatic monoalcohol and second between about 1 and 20 parts, by weight of the nitroalkane, of a cross linked N-vinylpyrrolidone polymer having a gel capacity in water of at least about 8, to produce a gelled fuel, bringing the fuel into contact with the oxidizing agent at the place it is desired that the explosion occur.

13. The gelled composition comprising by weight a mixture of (1) 100 parts of an organic liquid selected from the class consisting of halogenated alkenes and halogenated alkanes the latter containing at least 1 unsubstituted hydrogen atom and said halogenated alkenes and alkanes having from 1 to 5 carbon atoms, nitroalkanes having from 1 to 5 carbon atoms, tertiary alkyl amines having from 1 to 5 carbon atoms, ketones, esters formed by reacting at least one 1 to 4 carbon atom monocarboxylic acid with at least one 1 to 4 aliphatic monoalcohol, and methyl- and ethyl-substituted hydrazines, and (2) between about 1 and 30 parts of a 1 to 5 carbon atom aliphatic monoalcohol, said mixture having been admixed with (3) between about 0.1 and about 20 parts of a cross linked N-vinylpyrrolidone polymer which had a gel capacity in water of at least about 8 and a molecular weight of at least about 400,000.

14. The composition of claim 13 wherein the cross linked N-vinyppyrrolidone had been polymerized by subjecting a monomeric mixture thereof to irradiation for a time sufficient to provide a total of between about 0.3 and 3 megarads.